Feb. 17, 1925.
A. W. THOMPSON
1,526,514
COMBINED REGULATOR FOR INDEPENDENT CONTROL
OF WET BULB AND DRY BULB TEMPERATURES
Filed June 19, 1919  3 Sheets-Sheet 1
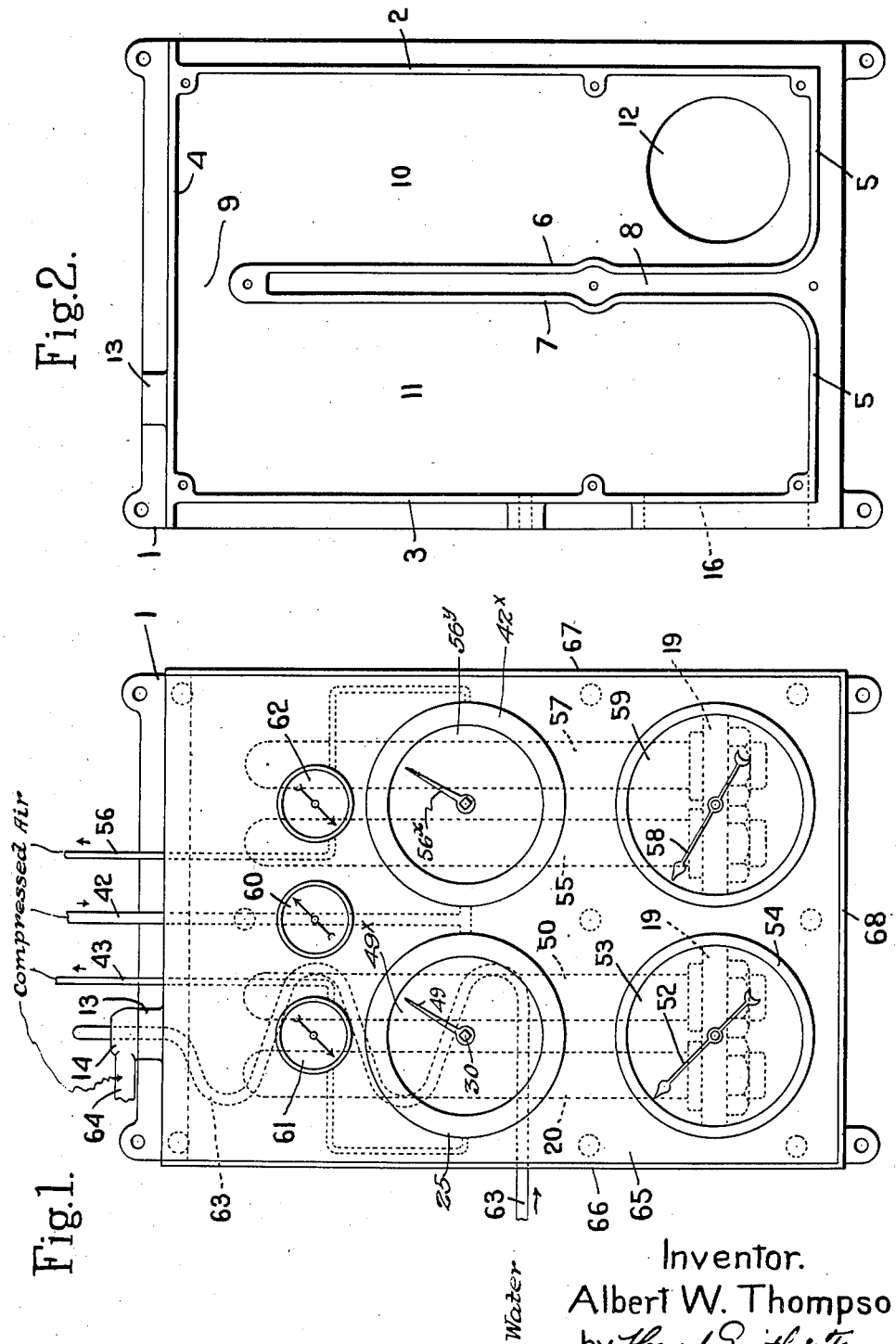
Inventor.
Albert W. Thompson
by Heard Smith & Tennant.
Attys.

Feb. 17, 1925. 1,526,514
A. W. THOMPSON
COMBINED REGULATOR FOR INDEPENDENT CONTROL
OF WET BULB AND DRY BULB TEMPERATURES
Filed June 19, 1919 3 Sheets-Sheet 2

Inventor.
Albert W. Thompson
by Heard Smith & Tennant.
Attys.

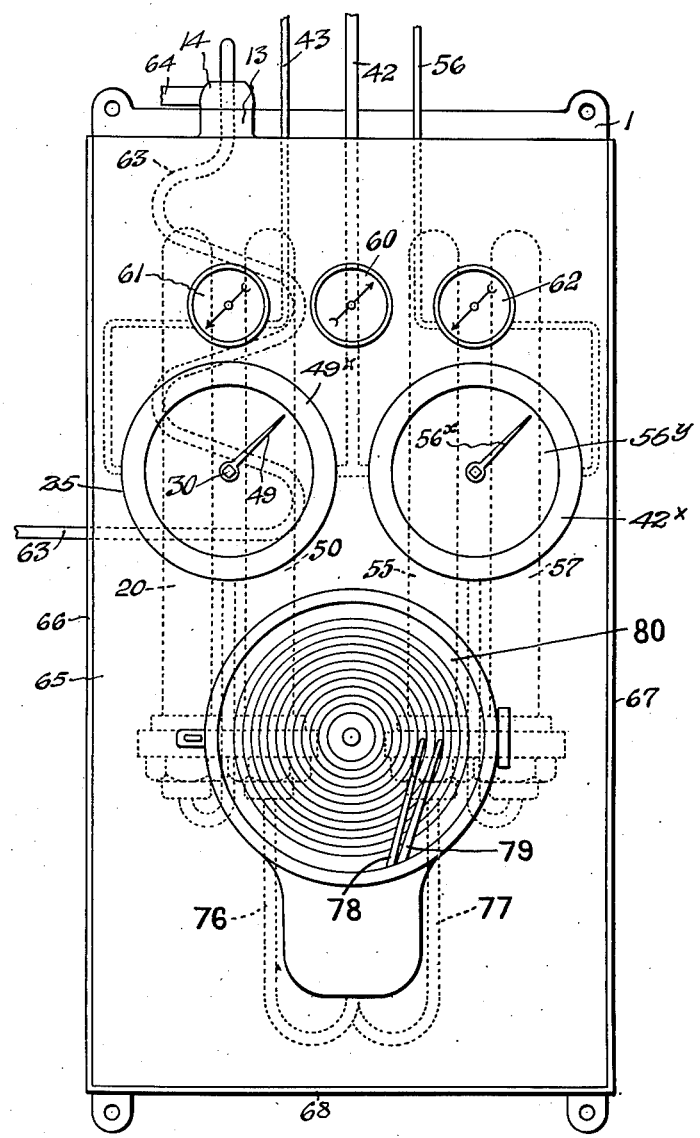

Patented Feb. 17, 1925.

1,526,514

UNITED STATES PATENT OFFICE.

ALBERT W. THOMPSON, OF LOWELL, MASSACHUSETTS, ASSIGNOR TO PARKS-CRAMER COMPANY, OF FITCHBURG, MASSACHUSETTS, A CORPORATION OF MASSACHUSETTS.

COMBINED REGULATOR FOR INDEPENDENT CONTROL OF WET BULB AND DRY BULB TEMPERATURES.

Application filed June 19, 1919. Serial No. 305,413.

*To all whom it may concern:*

Be it known that I, ALBERT W. THOMPSON, a citizen of the United States, and resident of Lowell, county of Middlesex, State of Massachusetts, have invented an Improvement in Combined Regulators for Independent Control of Wet Bulb and Dry Bulb Temperatures, of which the following description, in connection with the accompanying drawing, is a specification, like characters on the drawing representing like parts.

This invention relates to improvements in apparatus for indicating and regulating or controlling the condition of the air of an enclosure in which a predetermined condition of temperature or moisture content is desirable.

The principal object of the invention is to provide a self-contained device usable under a variety of conditions and which comprises every essential for actuation of means in control of sources of heat and of moisture for maintaining the desired condition and for indicating said condition.

The present invention differs materially from devices heretofore made for the purpose of controlling relative humidity, which are actuated by the differential expansion of elements subject respectively to the wet and dry bulb temperatures of the atmosphere such as described in Patent No. 1,228,718, granted June 5, 1917, to A. W. Thompson and E. W. Comfort.

The present invention is particularly adapted to control the atmospheric conditions in enclosures used for the drying of industrial products by artificially created heat which are effected by artificial evaporation of moisture or other volatile matter from the materials or surfaces of said products. An accurate knowledge and contol of such conditions are important considerations in such apparatus as ovens for drying painted or varnished products, and also, in drying machines of a continuous apron or truck-conveyor type. In all such cases it is desirable to control the progress of the drying process by maintaining such a predetermined relation between the temperature of the air and its moisture content as has proven by practice to produce the result desired.

The present invention contemplates the use of thermostatic means subject to the dry and wet bulb temperatures of the air and adapted respectively to control sources of energy which determine the temperature and the moisture content of the air of an inclosure.

The invention further contemplates the employment of conveniently arranged thermometric devices which will indicate respectively the dry and wet bulb temperatures of said air so that the operator may be able to observe the conditions present and to regulate the thermostatic device in accordance with the condition determined. In the preferred construction a cabinet is employed, comprising a primary chamber communicating with the inclosure and deriving its supply of air therefrom, and preferably a secondary chamber through which a current of air is drawn by the aspirating effect of a spray of water which serves the double purpose of maintaining the current of air and of saturating and reducing the same to its psychrometric wet bulb temperature. The respective chambers are provided with thermo-sensitive devices which will indicate respectively the dry bulb temperature and the psyhrometric wet bulb temperatures of the air in the primary and secondary chambers and actuate apparatus controlling the conditions of the air in the enclosure.

Typical and illustrative embodiments of my invention are illustrated in the accompanying drawings in which,—

Fig. 1 is a front elevation of one form of a regulator embodying my invention,

Fig. 2 is an elevation of the casing with the front removed,

Figure 3:
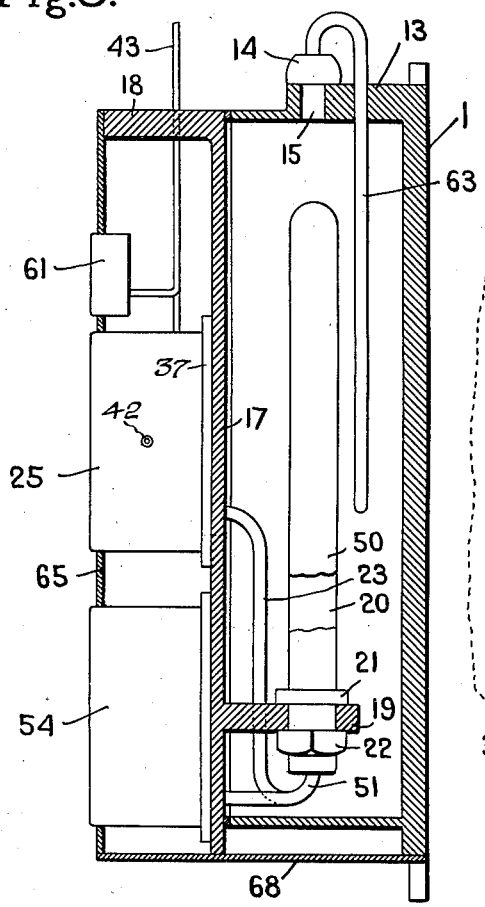
Figure 4:
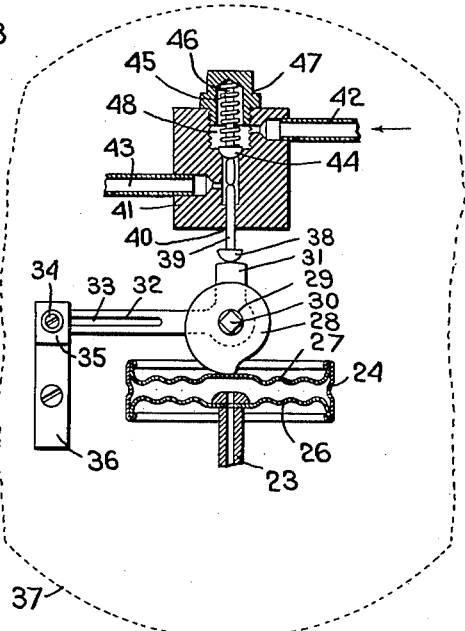
Figure 5:
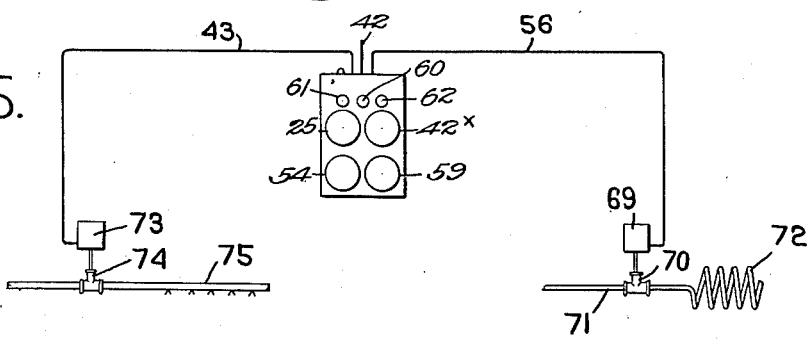

Fig. 3 is a vertical central sectional view through the wet bulb chamber of the casing, the spraying device, the thermo-sensitive members and the casings which enclose the indicating mechanisms being shown in elevation, Fig. 4 is a detail view showing the mechanism operable by the thermostatic device for controlling the power transmitting means which as illustrated is a valve mechanism in connection between two sections of a conduit for fluid under pressure, Fig. 5 is a diagrammatic view of the regulator adapted to control sources of heat and of moisture, and, Fig. 6 is an elevation of a modified form of regulator.

The regulator which is illustrated in Figs. 1, 2 and 3 preferably comprises a rectangular casing 1, which may be provided at its corners with suitable ears having screw holes by means of which the instrument may be attached to a wall or to the side of a machine. The casing desirably is provided with side walls 2, 3 and end walls 4, 5 and a middle partition formed by parallel extensions 6 and 7 of the walls 5 providing an insulating air space 8 between them. The central partition preferably terminates short of the upper end of the casing to provide a communicating passage 9 leading from one of the chambers, which will be hereinafter referred to as the "primary" or "dry bulb chamber" 10, with the other chamber 11, which will be designated as the "secondary" or "wet bulb chamber."

An inlet aperture 12 is provided at the lower end of the rear wall of the dry bulb chamber and a suitable boss or coupling may be formed upon or connected with the casing by means of which connection may be made to a conduit leading to the machine or inclosure containing the air to be conditioned.

The upper wall 4 of the casing is provided with an upwardly extending boss 13 forming a seat for the head 14 of a vaporizing device which may conveniently be in the form of a turbo head such as that illustrated and described in my prior Patent No. 869,945, granted November 5, 1907.

The spraying device 14 is positioned to discharge vapor through an aperture 15 in the boss 13 into the wet bulb chamber of the regulator and thereby to reduce the temperature of the air in such chamber to its psychrometric wet bulb temperature. Its face is adapted to register tightly with the face of the boss 13 so as to exclude the entry of air from outside of the cabinet. An important improvement is secured by locating the spraying device external to the passage or chamber through which the continuous sample of air is carried, since the atomizing or spraying device is accessible at all times for cleaning and adjustment without the necessity of entering either into the chambers of the cabinet or the enclosure in which the air is being maintained at a predetermined condition. This feature is extremely important since in the field of drying, the temperature of the air of the enclosure is always relatively high, so that access to the interior is difficult and also dangerous. In many cases the air is laden with dust or lint and it is, therefore, of great importance that the spraying device should be immune to the clogging effects of impurities and accessible at all times.

The spraying device has the further function of acting as an aspirator to induce a continuous current of air from the enclosure into the inlet aperture 12, thence upwardly through the dry bulb chamber, thence through the connecting passage 9 between the dry bulb chamber and the wet bulb chamber and finally to discharge the air through an aperture 16 in the side wall 3 of the casing where any condensation may be caught and delivered by a suitable drip catcher, not shown.

Thermo-sensitive members, adapted to control a source of power, are provided for the wet and dry bulb chambers respectively. Said chambers are also provided with thermometric means adapted to indicate respectively the temperatures of said wet and dry bulb chambers.

In the instruments illustrated in the accompanying drawing the casing is provided with a front plate 17 having at its top a forward extension 18 and near its bottom preferably rearwardly extending ledges 19. For convenience in assembling the thermostatic and thermometric members are mounted upon the front plate.

A convenient form of thermostatic means which is illustrated herein which is operable by the psychrometric wet bulb temperature of the air in the wet bulb chamber comprises a tubular member 20, containing an expansible fluid, either gaseous or liquid, having near its base a collar 21 which rests upon the ledge 19 in the wet bulb chamber. A nut 22 upon said tubular member serves to secure said member rigidly in vertical position beneath the aperture 15 through which spray is delivered to the wet bulb chamber.

A capillary tube 23 leads from the bottom of the tubular member or capsule 20 to an expansible bellows 24 which is contained in a cylindrical casing 25 suitably secured to the front side of the front plate 17. The bellows has two flexible walls 26 and 27 the upper of which engages the surface of a cam 28 which is fixedly secured upon a stud 29 having a squared end 30 by means of which it may be rotated to adjust the cam.

The stud 29 is journalled in the elbow of an L-shaped member 31, the longer arm 32 of which is provided with a slot 33 by means of which it is mounted upon a stud 34 carried by a bracket 35 suitably secured to an inner wall 36 of the cylindrical casing 25. The other arm of the member 31 preferably is slightly rounded at its top and engages the head 38 of a pin 39 which extends into a vertical aperture 40 in a block 41 which constitutes a connecting member between two sections 42 and 43 of a conduit containing fluid under pressure, such as air under pressure.

The upper end of the pin 39, which may be in two sections, engages the under side of a valve 44 which is held in its seat in the block 41 by a spring 45 which rests at its lower end against the valve 44 and surrounds the valve stem 46 of said valve and abuts at its upper end the bottom wall of a recess in a screw cap 47 which closes the outer end of the valve chamber 48.

In the operation of the device a fluid under pressure such as compressed air is maintained in the inlet pipe 42 by any suitable means and so long as the valve 44 is seated no air passes beyond the valve chamber 48. When, however, an expansion of the fluid in the tubular member or capsule 20 takes place by reason of an increase in temperature in the air in the wet bulb chamber the expanding fluid flows through the capillary tube 23 into the bellows 24 raising the upper wall 27 of the bellows thereby raising the cam 28 which in turn acts through the arm 31 to elevate the pin 39 and cause it to unseat the valve 44 whereupon the fluid under pressure rushes through the valve and thence through the outlet pipe 43 where it is utilized to operate a diaphragm motor or any other suitable device for controlling another source of energy such as a supply of vapor, spray or any suitable supply of moisture.

The cam 28 may be adjusted in such a manner that the pin 39 and the valve 44 will be actuated when the wet bulb member is subjected to a predetermined temperature, by rotating the stud 29 through its squared head 30 by a suitable key. Such adjustment may conveniently be indicated by an index finger 49 secured to the stud 29 and superposed over a suitable dial which may be graduated in any desired manner.

In order that the operator may be advised of the existing wet bulb temperature a thermo-metric device is also located in the wet bulb chamber. This thermometric device may be conveniently of a similar type comprising a tube or capsule 50, containing an expansible fluid, connected by a capillary tube 51 to suitable mechanism for actuating an index finger 52 which may be superposed over a suitable dial 53 within a cylindrical casing 54. The dial 53 preferably is graduated in degrees of temperature while the dial of the thermostat may be similarly graduated or provided with any other convenient form of graduations. An indicating thermometer of any suitable type may be used for this purpose.

The dry bulb chamber also is provided with a thermostatic means of the same character as those above described. As illustrated herein the tube or capsule 55 of the thermostatic device is connected to an apparatus and bellows, not shown, which controls the passage of air from the aperture 42 through a valve mechanism similar to that illustrated in Fig. 4 contained in a casing 42$^x$ and thence through a conduit 56 to a diaphragm valve or other means for controlling a separate source of energy, such as a heater. This valve mechanism may also be provided with an index 56$^x$ superposed over a suitable dial 56$^y$. This index and dial will, therefore, indicate the temperature for which the regulator is set.

A thermometric member comprising a tube 57 containing an expansible fluid is similarly mounted in the dry bulb chamber and actuates a similar mechanism for rotating an index finger 58 over the dial 59 to indicate the temperature of the air in the dry bulb chamber.

In order that the operator may at all times be advised of the condition under which the instrument is operating a pressure gage 60 is connected to the inlet pipe 42 whereby the pressure of the air supplied to the instrument will at all times be apparent.

Pressure gages 61 and 62 located respectively in the pipes 43 and 56 serve to indicate the pressure leading from the thermostatic devices which are controlled by the temperatures in the wet and dry bulb chambers respectively.

Inasmuch as the temperature of the water which is supplied to the vaporizing device is likely to vary at different times and in different seasons I have deemed it advisable to lead the conduit for said water supply first through the wet bulb chamber in order that it may be subjected to the wet bulb temperature of the air in said chamber. As illustrated herein this water pipe 63 enters the lower central part of the chamber and passes in sinuous curves back and forth through the rear portion of the wet bulb chamber, passing through the upper wall and finally terminating in the spray head 14. The water pipe 63 may, however, be brought through the enclosure itself, or any other path which avoids exposure to wide fluctuations of temperature. Air under pressure is supplied to the vaporizer head through a pipe 64 leading from any suitable supply.

In order to prevent improper action by the temperature of the surrounding air upon the instrument a convenient cover is provided which comprises a flat front 65 having apertures to receive the gages of the thermostatic and thermometric members and the indicators. Said cover also is provided with the sides and bottom portions 66, 67 and 68 which inclose the outer edges of the base plate 1 and provide air chambers surrounding three sides of the instruments lying respectively between walls 3 and 66; 2 and 67, and 5 and 68.

In Fig. 5 the operation of the device to control sources of heat and of moisture is diagrammatically illustrated. In the construction shown the pipe 56 leads from the controlling mechanism of the dry bulb thermostat to a diaphragm motor 69 which controls the valve 70 of a source of heat such as a steam pipe 71 having heating coils 72. In like manner the pipe 43 which leads from the controlling mechanism of the thermostatic means in the wet bulb chamber to the diaphragm motor 73 which controls a valve 74 in a pipe 75 designed to deliver spray or vapor to the air supply whether the air supply is a conduit leading to an inclosure or is the contents of the inclosure itself.

Fig. 6 illustrates a modified form of the invention adapted to produce a constant record of both the dry and wet bulb temperatures in which a similar casing is employed and of slightly different form and in which similar thermometric and thermostatic elements may be utilized. In the device illustrated in Fig. 6 however the tubes or capsules which contain the expansible fluid for actuating the thermometric devices, are connected respectively to capillary tubes 76 and 77 which operate respectively recording index fingers 78 and 79 superposed over and resting upon a dial 80 provided with concentric graduations indicating degrees of temperature and suitable transverse lines showing the time at which the record was made, such recording dial being rotated by the usual clockwork mechanism which is not shown, as it is common in instruments of this character.

In order to use the device it is only necessary to mount the same upon or near the walls of any inclosure, machine or duct, the condition of which it is desirable to control and to connect the inlet of the device with the interior of said inclosure, machine, or duct. If the dry bulb thermostat be now placed in control of a valve or other device for controlling the source of heat to be delivered to the air supply and if the wet bulb thermostat be in like manner put into control of the means for supplying moisture and the vaporizer placed in operation the regulator device will automatically function to control the amount of heat and moisture supplied to the air, so as to maintain it in a uniform condition, both as to temperature and moisture content, for the vaporizer will by aspiration cause a continuous sample of air to flow through the dry bulb and wet bulb chambers of the regulator, the temperature of this sample of air being reduced to its psychrometric wet bulb temperature by the evaporation of the spray from the vaporizer.

The thermometric members in the wet and dry bulb chambers will indicate respectively the temperatures of the same sample of air before and after saturation. The supply of moisture of the air of the enclosure will be correlated to the wet bulb temperature, while the supply of heat necessary to maintain the air supply at the desired predetermined temperature will be regulated by the thermostatic member which is subject to the temperature of the air in the dry bulb chamber of the instrument.

By reason of the fact that the wet and dry bulb temperatures are indicated or registered the operator is enabled to set the thermostatic devices in such a manner as to maintain the air supply at the desired temperature and to control the supply of moisture so as to produce the desired moisture content. For example, the thermostat of the dry bulb member should be adjusted until the thermometer indicates the dry bulb temperature desired, then the wet bulb thermostat may be adjusted until moisture is being supplied at a rate sufficient to maintain the wet bulb temperature constant at the desired point.

It will be understood that thermometric and thermostatic devices of different forms may be used within the spirit and scope of the following claims and that other forms of power transmitting mechanism than fluid under pressure may be employed for controlling the heat and moisture supplied, and that the power controlling means may be used for other purposes than those indicated herein.

It will also be understood that the combination of thermometric members and thermostatic members in the wet and dry bulb compartments of the cabinet is convenient, but not essential.

It will further be understood that the term "conditioning" as used in the following claims refers to the positive determination of the temperature and of the moisture content of the air in the enclosure by means of heat and of moisture supplied to said air from suitable sources.

Having thus described my invention, what I claim as new and desire to secure by Letters Patent is:

1. In an apparatus of the class described having means for supplying moisture to a body of air, a regulating device comprising a casing having a chamber provided with an inlet opening communicating with said body of air and an outlet opening, a spray head accessibly mounted externally to said casing and communicating with the chamber in said casing operable to aspirate a sample current of air from said body of air and saturate the same with moisture, a thermostatic wet bulb member in said chamber located in the path of the saturated sample current of air and means operable solely by said thermostatic wet bulb member for controlling the moisture delivered to said body of air by said moisture supplying means.

2. In an apparatus of the class described having means for varying the moisture content of a body of air, a regulating device comprising spraying means operable to produce a sample current of air from said body of air and to saturate the same with moisture including a conduit for delivering the water to said spraying means subject to the influence of the wet bulb temperature of the saturated sample current of air, a thermostatic wet bulb member located in the path of the current of saturated air and means operable by said thermostatic wet bulb member for controlling said moisture varying means.

3. In an apparatus of the class described having means for varying the moisture content of a body of air, a regulating device comprising a chamber having an inlet opening communicating with said body of air, means for delivering a spray into said chamber to aspirate a sample current of air from said body of air and to saturate the same with moisture including a conduit for delivering the water to said spray delivering means having a section located within said chamber in the path of said spray, a thermostatic device having a wet bulb member located in the path of the saturated sample current of air and subject to its temperature and means operable by said thermostatic device for controlling said moisture varying means.

4. In an apparatus of the class described having means for varying the moisture content of a body of air, a regulating device comprising a chamber having an inlet opening communicating with said body of air, means for delivering a spray into said chamber to aspirate a sample current of air from said body of air and to saturate the same with moisture, a closed receptacle containing a volatile liquid, a bellows communicating with said liquid-containing receptacle, means operable by the expansion and contraction of said bellows to control the moisture varying means and means including an adjustable cam engaging a wall of said bellows for regulating the action of the bellows upon the means for controlling the moisture varying means.

5. In an apparatus of the class described having means for varying the moisture content of a body of air, a regulating device comprising a chamber having an inlet opening communicating with said body of air, means for delivering a spray into said chamber to aspirate a sample current of air from said body of air and to saturate the same with moisture, a closed receptacle containing a volatile liquid, a bellows connected to said closed receptacle located in the path of said sample current of air, means operable by the expansion and contraction of said bellows to control the condition of said body of air and means including an adjustable cam for regulating the operation of the means for controlling the condition of the body of air.

6. In an apparatus of the class described having means for heating a confined body of air and means for varying the moisture content of said body of air, a regulating device having means for producing a continuous sample current of air from said body of air and saturating the same with moisture, a dry bulb thermostatic member located in the path of the sample current of air in advance of said saturating means and subject to the dry bulb temperature thereof, means operable solely by the dry bulb thermostatic member for regulating said heating means, a wet bulb thermostatic member located in the path of said sample current of air when saturated with moisture and means operable solely by said wet bulb thermostatic member for controlling said moisture varying means.

In testimony whereof, I have signed my name to this specification.

ALBERT W. THOMPSON.